2,953,604
Patented Sept. 20, 1960

2,953,604

PARTIAL HYDROGENATION OF 1,4-BUTYNEDIOL

Eugene V. Hort, Westfield, N.J., assignor to General Aniline & Film Corporation, New York, N.Y., a corporation of Delaware No Drawing. Filed Aug. 1, 1957, Ser. No. 675,542

2 Claims. (Cl. 260—635)

This invention relates to the catalytic partial hydrogenation of 1,4-butynediol to 1,4-butenediol.

The partial hydrogenation of 1,4-butynediol to 1,4-butenediol, hereinafter referred to as, respectively, butynediol and butenediol, in the presence of a number of different catalysts is known, and is disclosed for example in U.S. Patent No. 2,319,707. All of the catalysts heretofore employed have had serious limitations with respect to the hydrogenating conditions required, the yields obtained, and the like. For example, when a nickel catalyst is employed, part of the butynediol is reduced to the corresponding butanediol and a mixture containing butynediol, butenediol and butanediol is obtained. Poisoned or deactivated catalysts have been proposed but suffer the limitation of slow reaction rate and short catalyst life.

Palladium catalysts have been employed to give a stepwise reduction which may be interrupted at the butenediol stage, but concurrent side reactions such as isomerization take place producing gamma-hydroxybutyraldehyde which greatly reduces the yield. Further, relatively low temperatures are required in using palladium catalysts to minimize the production of resinous and other by-products. Maintenance of such low temperatures entails operational problems in addition to slowing the rate of reaction. Still further, catalyst poisoning is a common failing with palladium and other catalysts heretofore employed.

It is an object of this invention to provide a hydrogenation process for the reduction of butynediol to butenediol which will not be subject to the above disadvantages. Other objects and advantages will appear as the description proceeds.

The attainment of the above objects is made possible by the instant invention which is based upon the discovery that when a liquid dispersion containing a copper compound and metallic palladium is treated with a reducing agent such as hydrogen or hydrazine to precipitate metallic copper in situ on the palladium a copper coated or treated palladium catalyst is obtained which enables the catalytic hydrogenation of butynediol to butenediol in good yields and at high rates under relatively mild and easily controlled conditions.

The invention accordingly includes a process for hydrogenating butynediol to butenediol in the presence of such catalyst and more particularly a process for reducing butynediol to butenediol comprising treating butynediol with about 1 equivalent of hydrogen at about room temperature to 100° C. and about 1 to 20 atmospheres pressure in the presence of such catalyst.

It has been found that the above described copper treated palladium catalysts, the production of which is disclosed and claimed in my copending application Serial No. 675,549, entitled, "Hydrogenation Catalyst," filed concurrently herewith, are much more selective than palladium per se for the step-wise reduction of butynediol to butenediol while at the same time suppressing yield-reducing side reactions. The catalyst maintains its activity much longer, possibly because of the lowering of by-product formation and the poisoning produced thereby, and may accordingly be employed for an increased number of hydrogenation reactions. The maintenance of a high catalytic activity may also be due to an increased resistance to poisoning. The use of the above-described catalyst also enables the use of milder pressure conditions and, as distinguished from palladium catalyst per se, relatively elevated temperatures which accelerates the rate of reaction and facilitates control of the exothermic reaction.

In producing the above-described copper treated palladium catalysts, a liquid dispersion of a copper compound is first admixed with metallic palladium. The term "dispersion" as employed herein is inclusive of solutions and finely divided suspensions such as aqueous dispersions of hydrated copper oxides. Any copper compound or salt may be employed in the cuprous or cupric form which is a source of reducible copper. Optimum results are obtained with aqueous solutions, preferably in low concentrations ranging from about .02 to 2% by weight, although higher concentrations may be employed if desired. As examples of copper compounds which may be employed, there may be mentioned salts of strong acids such as copper sulfate, copper chloride, and copper nitrate, salts of weak acids such as copper cyanide, copper formate, copper acetate, and copper carbonate, and copper oxide. Aqueous solutions of salts of strong acids are preferably made slightly alkaline, as by addition of caustic soda or the like, whereby a dispersion of hydrated copper oxide is formed, which is then treated with a reducing agent in the presence of the metallic palladium. Aqueous solutions of readily soluble copper salts of weak acids need no adjustment of pH prior to reduction in the presence of the palladium. Copper carbonate and copper oxide are sparingly soluble and should preferably be dissolved in water in the presence of a small amount of weak acid such as acetic acid in forming the aqueous dispersion to be subjected to the action of a reducing agent in the presence of the metallic palladium.

The metallic palladium employed in making the catalyst employed herein may be in the form of finely divided particles of unsupported palladium, but in the interests of economy and the like, it is preferred to employ metallic palladium deposited on an inert carrier or support of known type, such as carbon, alumina, silica, and the like. Supported palladium catalysts may contain from about 1 to 20%, preferably about 2–10%, by weight of metallic palladium. An amount of liquid dispersion of the copper compound should be subjected to reduction in the presence of the metallic palladium sufficient to deposit on each part of palladium about 5 to 30 parts of copper.

The treatment of such dispersion with a reducing agent in the presence of the metallic palladium may be carried out in known manner, preferably by hydrogenation at temperatures ranging from room temperature to about 100° C., and from about 1 to 20 atmospheres pressure. Alternatively, hydrazine or other reducing agent may be employed. The resulting slurry containing the copper treated palladium catalyst may be filtered to separate the catalyst or may be directly employed as such for the liquid phase hydrogenation of butynediol.

In carrying out the liquid phase hydrogenation of butynediol to butenediol in accordance with the instant invention, the above described copper treated palladium catalyst is employed in the hydrogenation in catalytic amounts. The amount of catalyst employed will generally range from about 0.1 to 10%, and preferably from about 1 to 3% by weight of the butynediol, but such amount is not critical since the catalyst is not deactivated during the hydrogenation and is reused. For a given amount of butynediol to be hydrogenated, the rate of hydrogenation will vary directly with the amount of catalyst employed. The hydrogenation of the butynediol is preferably carried out in an aqueous medium, but other liquid media may be employed which are solvents for the butynediol, such as alcohols, dioxane or mixtures thereof.

Although any desired hydrogenating conditions may be employed in the reduction of the butynediol to butenediol, a further feature of the instant invention resides in the discovery that the above-described copper treated palladium catalyst enables the use of relatively low hydrogen pressures ranging from about 1 to 20 atmospheres and preferably from about 3 to 10 atmospheres, and temperatures ranging from about room temperature to 100° C., and preferably from about 40 to 75° C. The lower pressures enable the use of ordinary equipment, and the temperatures employed are readily controllable, requiring less cooling of the exothermic reaction, and serve to accelerate the reatcion as compared with the lower temperatures heretofore required with palladium catalysts. In using higher temperatures within the above range, it is desirable to employ higher pressures in order to increase the rate of production of the desired butenediol while minimizing the formation of by-products.

In the hydrogenation of the butynediol, it is preferred to employed slightly less than the theoretical amount of hydrogen required to form butenediol, preferably about 90–95% of theoretical. The reaction is readily controlled by either metering in the calculated or predetermined amount of hydrogen or by brominating test samples of the reaction medium at intervals until the unsaturation reaches about 55% of the unsaturation of the original starting medium. The hydrogen is preferably maintained over the surface of the reaction medium containing the butynediol and contact is facilitated by agitation, as by rocking or shaking the reaction vessel, or by stirring the reaction medium with a high speed propeller or the like.

As pointed out above, in addition to being a catalyst for the hydrogenation of butynediol, palladium also catalyzes isomerization or other competing reactions of the butynediol. The copper deposited on the palladium as described above appears to suppress such competing reactions with little effect on the hydrogenation reaction. The butenediol product is relatively pure and obtained in higher yields because of the reduced amounts of by-products. The catalyst lasts longer apparently because the resinous by-products ordinarily formed, which tend to poison the catalyst surface, are eliminated. At the same time, the rate of hydrogenation is not reduced, as is the case when using intentionally poisoned catalysts to obtain the desired partial reduction of the butynediol.

As illustrative of the competing reaction of butynediol catalyzed by palladium, it was found that when a palladium catalyst was agitated with butynediol for 10 hours at 60° C., admitting hydrogen for only 1 minute each hour to maintain the activity of the catalyst, a product was obtained which violently polymerized when an attempt was made to separate it by distillation. On the other hand, when the above procedure was repeated using the copper treated palladium catalyst of the instant invention, there was no change in the butynediol and all of it was recovered.

The following examples, in which parts are by weight unless otherwise indicated are illustrative of the instant invention and are not to be regarded as limitative.

*Example 1*

Five grams of 5% palladium on charcoal (commercially available catalyst containing 5% palladium, 95% charcoal) are rocked for 1 hour in 100 g. of 5% aqueous copper acetate solution at 40° C. under 75 p.s.i.g. of hydrogen pressure.

The resulting catalyst is used to hydrogenate three successive 674 g. (3.0 moles) portions of 38.3% aqueous butynediol at 40° C. and 75 p.s.i.g. of hydrogen pressure. Each hydrogenation is interrupted when 95% of one equivalent of hydrogen has been added. Each run requires 5 hours.

Each run is in turn filtered from the catalyst and the filtrate vacuum distilled. The total diols obtained are as follows: run 1, 233 g. (88.4%), S.P. (solidification point) 6.8° C., $N_D^{25}$ (index of refraction) 1.4766; run 2, 234 g. (88.7%), S.P. 7.0° C., $N_D^{25}$ 1.4762; run 3, 231 g. (87.4%), S.P. 7.8° C., $N_D^{25}$ 1.4768.

On fractional redistillation over 90% of the diols is recovered as butenediol of S.P. above 10° C.

*Example 2*

The procedure of Example 1 is repeated but with untreated palladium catalyst and only one run instead of a series.

The run requires 5 hours. Only 161 g. (61%) of diols S.P. 3.6° C. are obtained. On fractional distillation 81% (49.4% overall) of the diols is recovered as butenediol S.P. 10° C.

This invention has been disclosed with respect to certain preferred embodiments, and there will become obvious to persons skilled in the art various modifications, equivalents or variations thereof which are intended to be included within the spirit and scope of this invention.

I claim:

1. A process for reducing 1,4-butynediol to 1,4-butenediol comprising treating 1,4-butynediol with about 1 equivalent of hydrogen gas at about room temperature to 100° C., and about 1 to 20 atmospheres pressure in the presence of a catalyst comprising metallic palladium carrying metallic copper precipitated in situ thereon by treatment of a liquid dispersion containing a copper compound and metallic palladium with a reducing agent.

2. A process for reducing 1,4-butynediol to 1,4-butenediol comprising treating 1,4-butynediol with about 1 equivalent of hydrogen gas at about 40 to 75° C. and about 3 to 10 atmospheres pressure in the presence of a catalyst comprising metallic palladium carrying metallic copper precipitated in situ thereon by treatment of a liquid dispersion containing a copper compound and metallic palladium with a reducing agent.

References Cited in the file of this patent

UNITED STATES PATENTS

| | | |
|---|---|---|
| 2,267,749 | Reppe et al. | Dec. 30, 1941 |
| 2,300,598 | Schnabel et al. | Nov. 3, 1942 |
| 2,516,826 | Smith | July 25, 1950 |
| 2,802,889 | Frevel et al. | Aug. 13, 1957 |